US006614223B2

(12) United States Patent
Schroeder et al.

(10) Patent No.: US 6,614,223 B2
(45) Date of Patent: Sep. 2, 2003

(54) ANALOG ANGLE ENCODER HAVING A SINGLE PIECE MAGNET ASSEMBLY SURROUNDING AN AIR GAP

(75) Inventors: Thaddeus Schroeder, Rochester Hills, MI (US); Bruno Patrice Bernard Lequesne, Troy, MI (US); Avoki M. Omekanda, Rochester, MI (US); Steven Douglas Thomson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/929,149

(22) Filed: Aug. 14, 2001

(65) Prior Publication Data

US 2003/0034775 A1 Feb. 20, 2003

(51) Int. Cl.$^7$ ................................................. G01B 2/30
(52) U.S. Cl. ............................. 324/207.22; 324/207.21; 324/207.25
(58) Field of Search ..................... 324/207.22, 207.2, 324/207.21, 207.24, 207.25; 335/302, 306

(56) References Cited

U.S. PATENT DOCUMENTS 4,779,069 A  * 10/1988 Brown ........................ 335/306
4,810,965 A  *  3/1989 Fujiwara et al. ........ 324/207.21
5,754,042 A      5/1998 Schroeder et al. ..... 324/207.25

* cited by examiner

Primary Examiner—Walter E. Snow
(74) Attorney, Agent, or Firm—Margaret A. Dobrowitsky

(57) ABSTRACT

An analog angle encoder having a simply constructed magnet assembly, wherein rotation of a magnetic field relative to a magnetosensitive device provides a varying output of the magnetosensitive device that varies sinusoidally with the angle of relative rotation. The simply constructed magnet assembly is of a closed-path geometry composed of a single piece of magnetic material wherein only a first portion thereof is magnetized for providing the aforesaid magnetic field for the sensor. The remaining portion of the magnet material (the second portion) remains unmagnetized and does not substantially influence the magnetic field produced by the first portion any more than, for example, air would cause.

4 Claims, 4 Drawing Sheets

ANALOG ANGLE ENCODER HAVING A SINGLE PIECE MAGNET ASSEMBLY SURROUNDING AN AIR GAP

TECHNICAL FIELD

The present invention relates to rotary magnetic position sensors used to measure angular displacements, and more particularly to magnet assemblies used therewith.

BACKGROUND OF THE INVENTION

The use of magnetoresistors (MRs) and Hall devices as position sensors is well known in the art. For example, a magnetically biased differential MR sensor may be used to sense angular position of a rotating toothed wheel, as for example exemplified by U.S. Pat. No. 5,754,042.

Position sensors with digital outputs provide discrete position information only whereas an analog position sensor can provide both position information and outputs that can be used to drive an electric motor or other similar electromechanical devices. Many of these devices are driven by sinusoidal excitations as a function of position. Consequently, an analog position sensor having an output that varies sinusoidally with position could be used to generate absolute angular positions as, for example, an electrical power steering system to measure the angle of rotation of the steering wheel, and/or reference signals to produce the desired sinusoidal phase drive currents and voltages to drive electric motors and other similar electromechanical devices. Applications may further include throttle position sensors, pedal position sensors in drive-by-wire systems, body height position sensors for automotive suspension systems, a 3-phase sine generator for brushless motors, a sine/cosine resolver for servo motors, etc.

The operational principle of an angle encoder sensor 10, shown at FIGS. 1 and 2, is based upon the property of Hall plates and semiconductor magnetoresistors, collectively referred to herein as magnetosensitive devices 12, to sense only the normal component of the magnetic field B which passes through them as relative rotation R occurs about a rotation axis A, wherein the field is provided by two permanent magnets 14, 16 that are mutually spaced apart a distance g, wiring 18 provides a current connection to an external circuit. Consequently, if a constant and uniform magnetic field is rotated in the plane perpendicular to the surface of a magnetosensitive device, the output signal will vary as the cosine of the angle between the direction of the incident magnetic field lines and the line normal to the surface of the device, that is, in proportion to B·Cos α, wherein α denoted the angular rotation and the angle of the flux lines relative to the normal of the surface of the sensor. It is preferred in this regard, that the magnetosensitive device be linear in its response to change in direction of the incident magnetic field, such as that provided by Hall plates; however, magnetoresistors operating in their linear region can also be used. In addition, operation over any ambient temperature range may require temperature compensated magnetosensitive devices. Also, it should be noted that included by the term "magnetosensitive devices" are ferromagnetic magnetoresistors, including giant magnetoresistor (GMR) sensors, which can also be used although these are less preferred because their resistance versus magnetic flux density saturates at a relatively low level compared with Hall sensors that do not saturate.

While a conventional magnet assembly having two structurally independent magnets functions admirably, it has drawbacks. For example, there is a duplication cost associated with providing two separate magnets, and there is an associated assembly operation with its own inherent problems, including for example the possibility of mislocation or misalignment of the magnets relative to each other, relative to the magnetosensitive device and/or relative to the rotation axis, thus necessitating precautions which add further to the cost of assembly.

Accordingly, what remains needed is a compact, inexpensive contactless position sensor having a sinusoidally varying output suitable for sensing schemes, wherein the magnet assembly thereof is simply constructed.

SUMMARY OF THE INVENTION

The present invention is an analog angle encoder having a simply constructed magnet assembly, wherein rotation of a magnetic field relative to a magnetosensitive device provides a varying output of the magnetosensitive device that varies in a predetermined manner (preferably sinusoidally) with respect to the angle of relative rotation.

The analog angle encoder according to the present invention includes a simply constructed magnet assembly and a magnetosensitive device situated in the magnetic field provided by the simply constructed magnet assembly such that relative rotation between the magnetic field and the magnetosensitive device provides a predetermined signal indicative of the angular position of the magnetosentivie device relative to the direction of magnetic field incident thereto.

Further according to the present invention, the simply constructed magnet assembly is composed of a single piece of magnetic material wherein only a first portion thereof is magnetized, and this first portion provides the aforesaid magnetic field for the sensor. The remaining (second) portion of the magnet material remains unmagnetized. This second (unmagnetized) portion does not substantially influence the magnetic field produced by the first (magnetized) portion—any more than, for example, air would cause.

Generally, the simply constructed magnet assembly may have any suitable closed-path geometry, wherein provided are two symmetrically disposed, mutually attracting magnetic poles which provide a suitably uniform magnetic field in the air gap therebetween. Advantageously, because the magnet assembly is simply constructed, meaning that it is of a single piece construction, the placement of the magnet poles is precise and cannot drift over time.

According to a preferred mode of making, the magnetic material is of ferrite, preferably of the ceramic-cobalt type, which may be molded (as for example by extrusion) into a desired shape, machined into the desired shape, or some combination thereof. Magnetization of the first portion of the magnet assembly may, for example, be performed using a magnetizer with pole pieces shaped to induce magnetization only at the first portion. The second portion, unmagnetized by the magnetizer, will behave magnetically (have a permeability) similar to air.

Accordingly, it is an object of the present invention to provide an analog angle encoder having a simply constructed magnet assembly, wherein a signal is produced responsive to sensed relative rotation between a magnetosensitive device and the applied magnetic field is provided by the simply constructed magnet assembly.

This, and additional objects, features and benefits of the present invention will become apparent from the following specification.

DESCRIPTION OF THE PREFERRED EMBODIMENT

Figure 3:
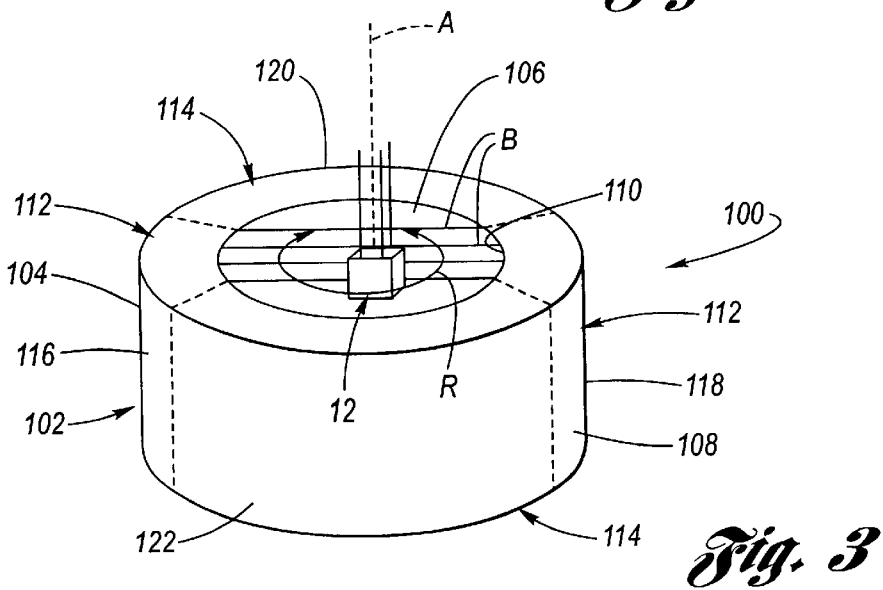
FIG. 3 is a perspective view of an analog angle encoder according to the present invention, including a simply constructed magnet assembly.
Figure 4:
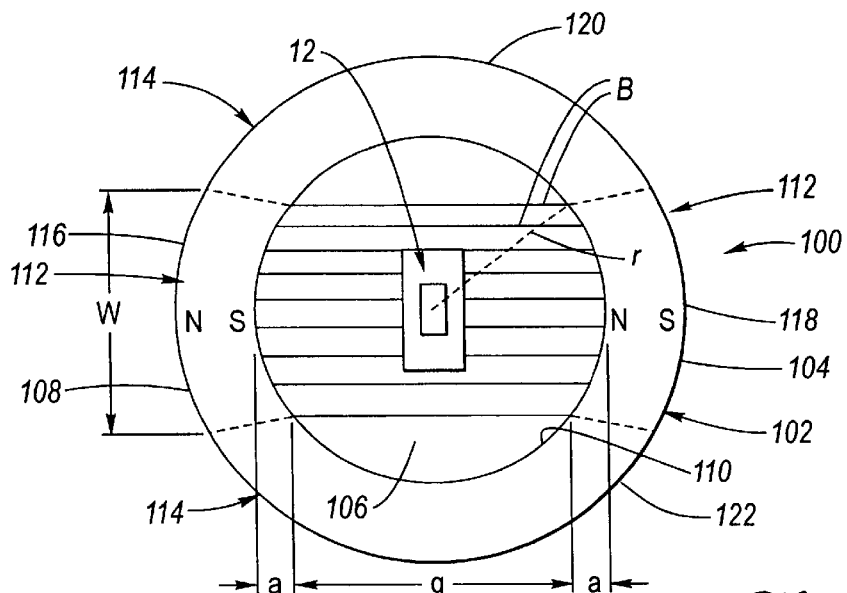
FIG. 4 is a top plan view of the analog angle encoder according to the present invention shown at FIG. 3.
Figure 5:
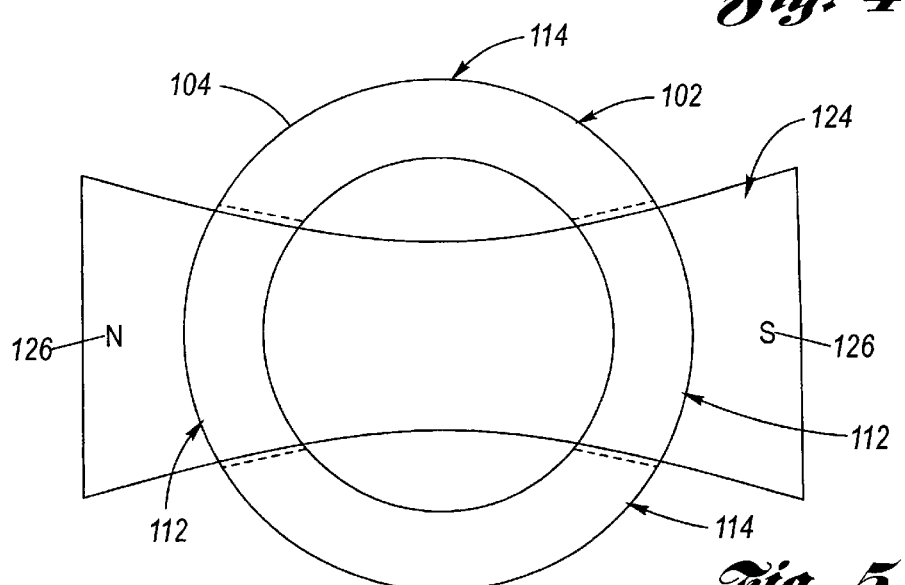
FIG. 5 is a top plan view of a simply constructed magnet assembly having a first portion thereof being magnetized by a magnetizer.

Turning attention now to the Drawings, FIGS. 3 through 10 depict examples of analog angle encoders, each featuring a simply constructed magnet assembly. Turning attention firstly to FIGS. 3 through 5 the structure and function of an analog angle encoder sensor 100 will be detailed.

Figure 1:
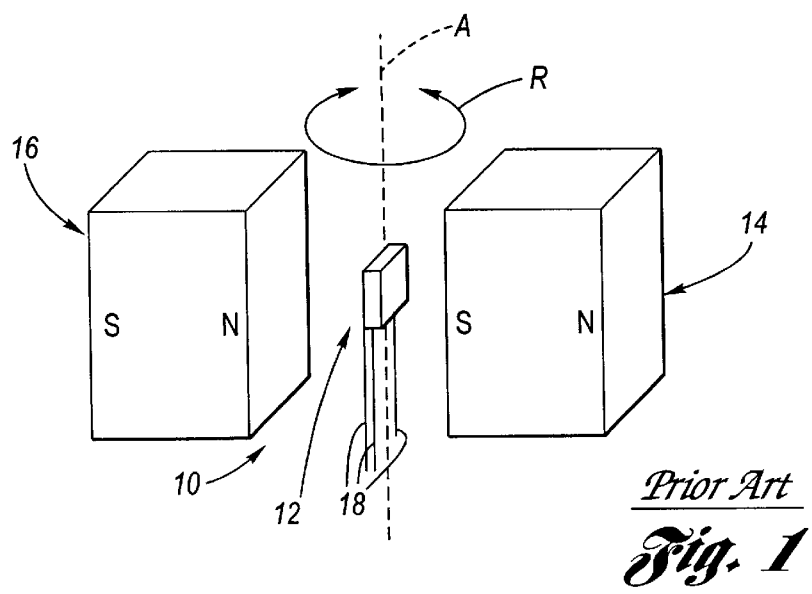
FIG. 1 is a schematic perspective view of a prior art analog angle encoder.
Figure 2:
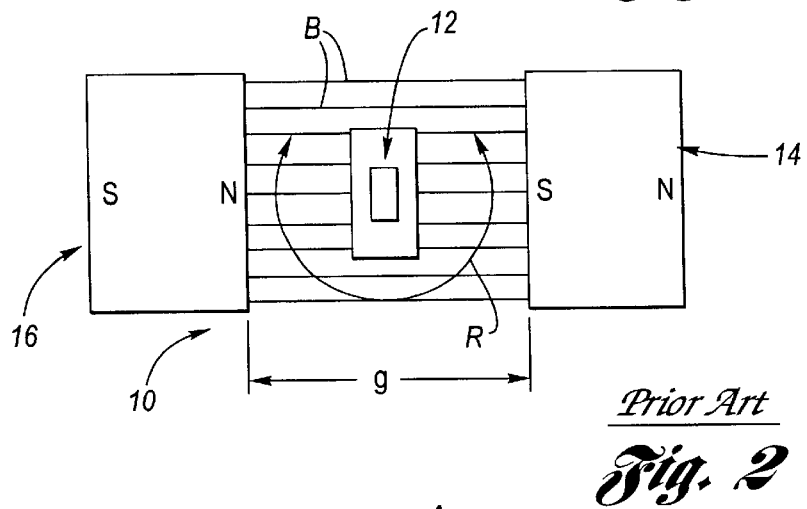
FIG. 2 is a top plan view of the prior art analog angle encoder of FIG. 1.

The analog angle encoder 100, is, as described hereinabove with regard to FIGS. 1 and 2, based upon the property of Hall plates and semiconductor magnetoresistors, collectively referred to herein as magnetosensitive devices 12, to sense only the normal component of the magnetic field B which passes through them as relative rotation R occurs about a rotation axis A. Now, however, rather than two separate and structurally independent magnets, the magnetic field is provided by a simply constructed magnet assembly 102 having a closed-path geometry. By "simply constructed" is meant that the magnet assembly 102 is of a single piece construction.

The simply constructed magnet assembly 102 has, by way of example, a cylindrically shaped geometry, wherein a cylindrical shell 104 subtends an inner cylindrically shaped air gap 106. Broadly speaking, the cylindrical shell 104 is defined by an outer cylinder surface 108 and an inner cylinder surface 110, each mutually defined by parallel lines intersecting a planar closed curve. The planar closed curve may be any closed curve, as for example a circle, a polygon, etc. The inner and outer cylinder surfaces may or may not be similarly shaped, and further may, or may not be mutually concentric, wherein FIGS. 3 through 5 depict, by way of simplified example, a concentric geometry.

Regardless of the chosen geometry of the simply constructed magnet assembly 102, the material thereof is partly magnetized and partly unmagnetized, resulting in a first magnetized portion 112 and a second unmagnetized portion 114, wherein dashed lines indicate the demarcation therebetween. This selective magnetization is such as to create two generally symmetrically (diametrically) disposed magnetized regions 116, 118. These two magnetized regions 116, 118 are separated by unmagnetized regions 120, 122, and collectively act as two separate, symmetrically disposed, mutually attracting magnets. The unmagnetized regions 120, 122 essentially have the magnetic properties (permeability) of air. The aforementioned symmetry of the magnetized regions 116, 118 serves as essentially the only limit to the choice of geometry of the simply constructed magnet assembly. The second unmagnetized portion 114 may be formed of a different thickness from that of the first magnetized portion 112. For example, the second unmagentized portion 114 may be made with less thickness than that of the first magnetized portion 112 so as to reduce weight and material, yet retain the closed-path geometry of the simply constructed nature of the magnet assembly.

The analog angle encoder 100 has a number of advantages, including: reduction of parts, and easier and assured alignment of the magnetic poles.

In the simply constructed magnet assembly 102 as depicted at FIGS. 3 and 4, the magnetized regions 116, 118 are each a magnet, having a width W, separated by an air gap g having a curvature aspect a, and each being rigidly located by the unmagnetized regions 120, 122 of the closed-path geometry.

FIG. 5 depicts a preferred mode of selectively magnetizing a portion of the simply constructed magnet assembly 102. The magnetic material composing the closed-path geometry shell 104 of the simply constructed magnet assembly 102 is of ferrite, preferably of the ceramic-cobalt type, which may be molded (as for example by extrusion) into a desired shape, machined into the desired shape, or some combination thereof. Magnetization of the first magnetized portion 112 to provide the magnetized regions 116, 118 is performed using a conventional high gauss electromagnet magnetizer 124, wherein the pole pieces 126 thereof are shaped and oriented relative to the simply constructed magnet assembly so as to induce magnetization only at the first magnetized portion. The second unmagnetized portion 114 which is unmagnetized by the magnetizer, will behave magnetically (have a permeability) similar to that of air.

Figure 6:
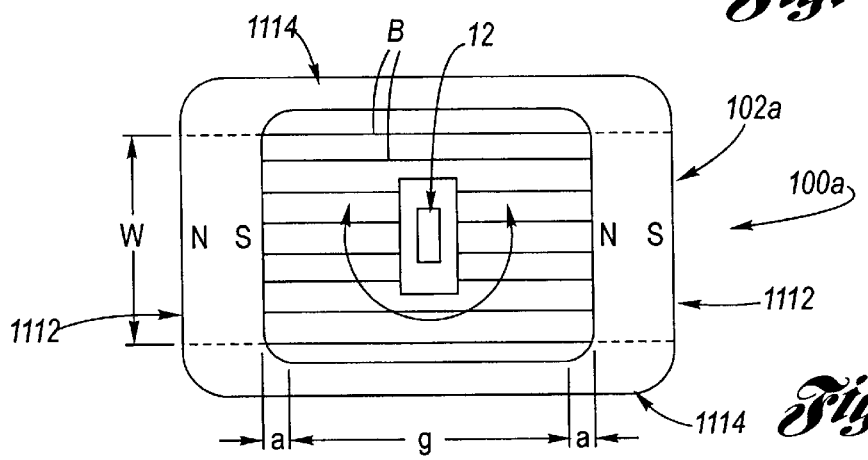
FIG. 6 is a top plan view of an analog angle encoder according to the present invention, showing a first alternative simply constructed magnet assembly geometry.

Turning attention now to FIGS. 6 through 10, for purposes of illustration, several alternative simply constructed magnet assemblies will be described FIG. 6 depicts an analog angle encoder 100a having a rectangularly shaped closed-path geometry of the simply constructed magnet assembly 102a, including a first magnetized portion 1112 and a second unmagnetized portion 1114. The geometry of FIG. 6 may be preferable over that of FIGS. 3 and 4, in that for a circular cylindrical geometry the magnet to magnet (pole to pole) distance is equal to the inner radius r, while the smaller distance from one magnetized part to the other (distance g) is determined by the magnet radius and the width W of the first magnetized portion. That is, if the geometry is circular, the distance g and the width W are linked together, and are a function of the radius r. Of course, it would be most desirable to be free to choose these two dimensions independently of one another, as well as independently with respect to the inner radius r. On the other hand, the inner radius r is preferably as small as possible in order to reduce the over-all size of the sensor and to have the largest possible flux density at the magnetosensitive device 12. Yet, the width W should be as large as possible in order to create the broadest possible region of uniform magnetic field in the middle of the air gap. These two desires are contradictory, inasmuch as they lead to having large curvature aspects a at the inner surfaces of the first magnetized portions, and thus leading to having a small distance g between the two magnet inner surfaces. In general, rounded corners will make it possible to choose g, a and W independently of one another.

Figure 7:
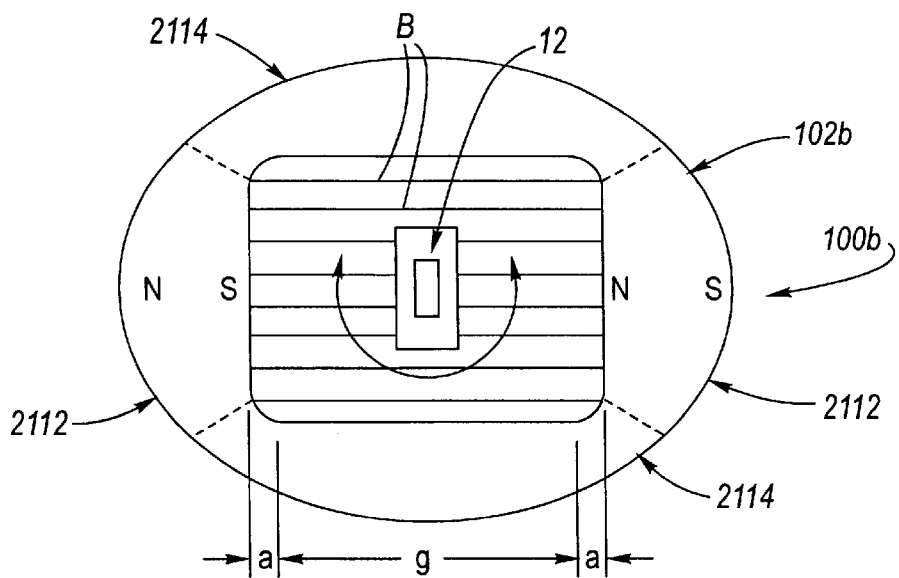
FIG. 7 is a top plan view of an analog angle encoder according to the present invention, showing a second alternative simply constructed magnet assembly geometry.
Figure 8:
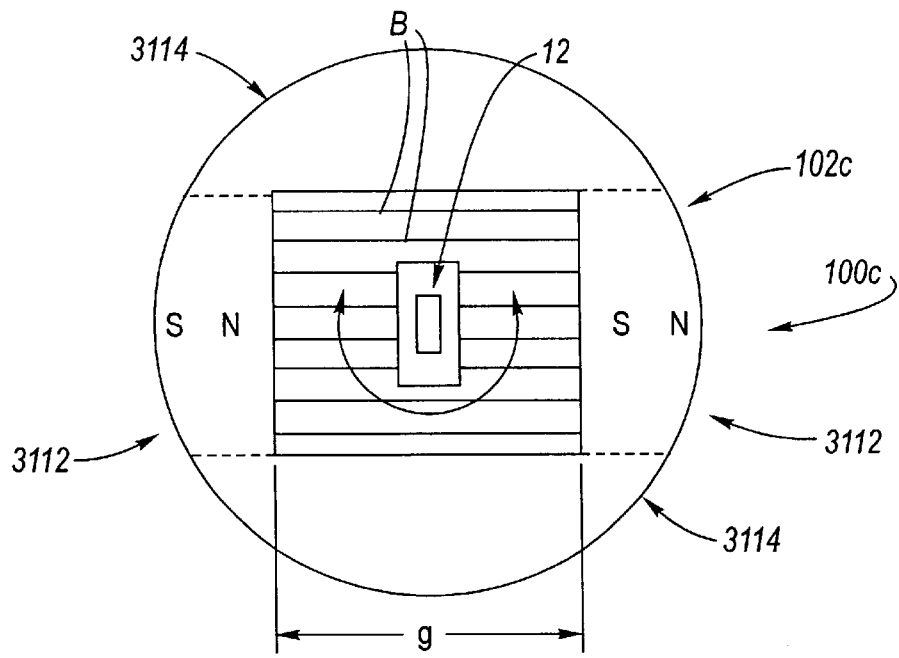
FIG. 8 is a top plan view of an analog angle encoder according to the present invention, showing a third alternative simply constructed magnet assembly geometry.

In FIG. 6, as well as in FIG. 4, the inner and outer surfaces have, respectively, essentially the same shape. In the example of FIG. 4, this takes the form of two concentric circles, and in the case of FIG. 6, this takes the form of two concentric rectangles with rounded corners. However, as indicated hereinabove, the inner and outer surfaces need not be shaped mutually similar. For example, the outer surface may intersect a circle or an ellipse, while the inner surface may intersect a square, rectangle, etc., as shown for example by FIGS. 7 and 8. With regard to FIG. 7, depicted is an analog angle encoder 100b having a simply constructed magnet assembly 102b including a first magnetized portion 2112 and a second unmagnetized portion 2114, wherein the inner surface is generally rectangular and the outer surface is generally oval. With regard to FIG. 8, depicted is an analog angle encoder 100c having a simply constructed magnet assembly 102c including a first magnetized portion 3112 and a second unmagnetized portion 3114, wherein the inner surface is generally square and the outer surface is generally circular. Further, while a radiused corner deflection is often preferable, its presence is not mandatory. In this regard, note the small curvature aspect a of FIG. 7 and the absence thereof in FIG. 8.

Figure 9:
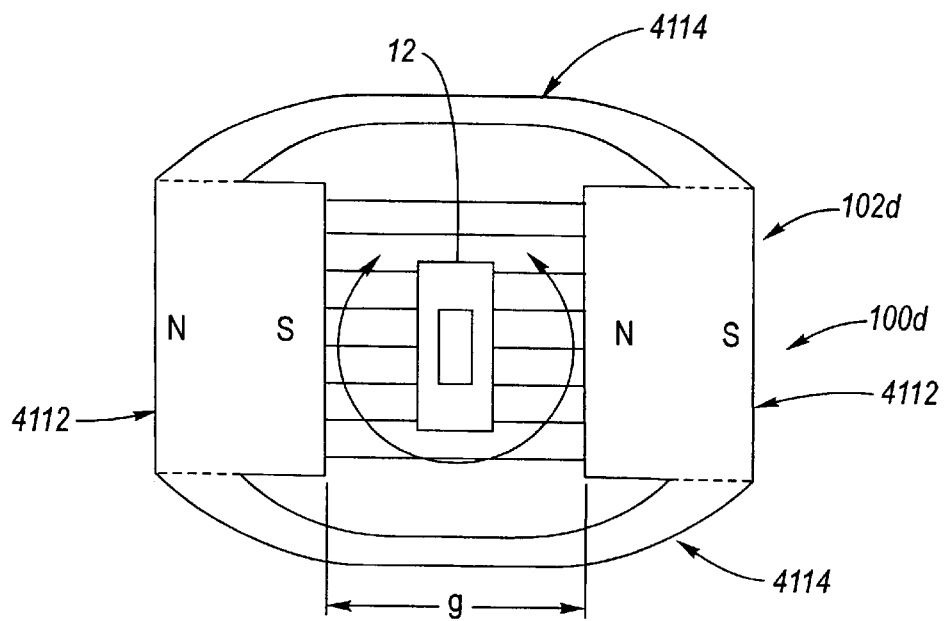
FIG. 9 is a top plan view of an analog angle encoder according to the present invention, showing a fourth alternative simply constructed magnet assembly geometry.
Figure 10:
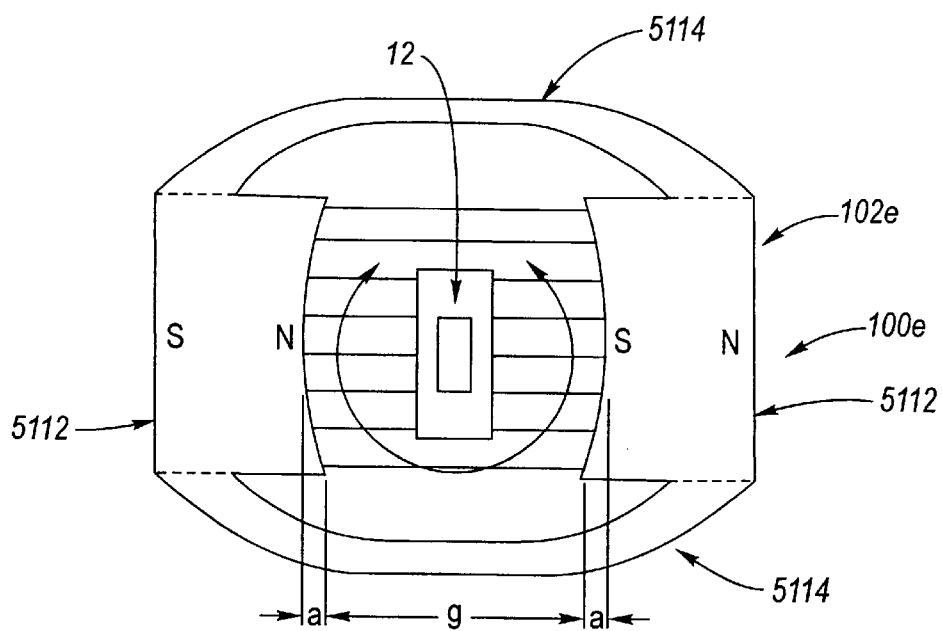
FIG. 10 is a top plan view of an analog angle encoder according to the present invention, showing a fifth alternative simply constructed magnet assembly geometry.

The inner surface may be smoothly shaped, as for example the concave shapes described. However, the inner surface may be complexly shaped to include a number of local shapes which may include concave, convex curvatures, as for example depicted at FIGS. 9 and 10. With regard to FIG. 9, depicted is an analog angle encoder 100d having a simply constructed magnet assembly 102d including a first magnetized portion 4112 and a second unmagnetized portion 4114, wherein the inner surface is concave at the second unmagnetized portion and straight and protrubing at the first magnetized portion. With regard to FIG. 10, depicted is an analog angle encoder 100e having a simply constructed magnet assembly 102e including a first magnetized portion 5112 and a second unmagnetized portion 5114, wherein the inner surface is concave at the second unmagnetized portion and concave and protruding at the first magnetized portion. Complex inner surface geometries may be of particular significance because of the facility such configurations give to pole shaping, yet because of the simply constructed nature of the magnet assembly a single physically unified piece is yet provided.

Referring back to the geometry shown at FIGS. 3 and 4, because of possible limitations on the magnetizing process, the two magnetized regions 116, 118 and unmagnetized regions 120, 122 may not become perfectly delineated after the magnetization process has completed. However, the complex inner surface geometry which, as shown at FIGS. 9 and 10, provides clearly resolved poles, the magnetization process of these poles provides a clear delineation between the magnetized and unmagnetized portions of the simply connected magnet assembly.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An analog angle encoder comprising:

at least one magnetosensitive device; and a simply constructed magnet assembly comprising a single piece of magnetic material, and further comprising a first portion which is magnetized and a second portion which is unmagnetized;

wherein said simply constructed magnet assembly has a predetermined closed-path geometry which surrounds an air gap, wherein a magnetic field produced by said first portion passes through said air gap, and wherein said magnetosensitive device is located within said air gap;

wherein said closed-path geometry defines an inner surface and an outer surface;

wherein said first portion comprises two symmetrically spaced, mutually attracting magnets;

wherein said inner surface has a first predetermined shape, and wherein said outer surface has a second predetermined shape;

wherein said first and second predetermined shapes are mutually similar; and wherein said first and second predetermined shapes are substantially rectangular.

2. An analog angle encoder comprising:

at least one magnetosensitive device; and a simply constructed magnet assembly comprising a single piece of magnetic material, and further comprising a first portion which is magnetized and a second portion which is unmagnetized;

wherein said simply constructed magnet assembly has a predetermined closed-path geometry which surrounds an air gap, wherein a magnetic field produced by said first portion passes through said air gap, and wherein said magnetosensitive device is located within said air gap;

wherein said closed-path geometry defines an inner surface and an outer surface;

wherein said first portion comprises two symmetrically spaced, mutually attracting magnets; and wherein said inner surface has a first predetermined shape, and wherein said outer surface has a second predetermined shape;

wherein said first and second predetermined shapes are mutually dissimilar.

3. An analog angle encoder comprising:

at least one magnetosensitive device; and a simply constructed magnet assembly comprising a single piece of magnetic material, and further comprising a first portion which is magnetized and a second portion which is unmagnetized;

wherein said simply constructed magnet assembly has a predetermined closed-path geometry which surrounds an air gap, wherein a magnetic field produced by said first portion passes through said air gap, and wherein said magnetosensitive device is located within said air gap;

wherein said closed-path geometry defines an inner surface and an outer surface;

wherein said first portion comprises two symmetrically spaced, mutually attracting magnets;

wherein said inner surface has a first predetermined shape, and wherein said outer surface has a second predetermined shape; and wherein said first predetermined shape comprises a generally complex shape, wherein the inner surface at said first portion is distinctly protruberant with respect to said inner surface at said second portion.

4. An analog angle encoder comprising:

at least one magnetosensitive device; and a simply constructed magnet assembly comprising a single piece of magnetic material, and further comprising a first portion which is magnetized and a second portion which is unmagnetized;

wherein said simply constructed magnet assembly has a predetermined closed-path geometry which surrounds an air gap, wherein a magnetic field produced by said first portion passes through said air gap, and wherein said magnetosensitive device is located within said air gap;

wherein said closed-path geometry defines an inner surface and an outer surface;

wherein said first portion comprises two symmetrically spaced, mutually attracting magnets; and wherein said first portion has a first average thickness between said inner and outer surfaces, and wherein said second portion has a second average thickness between said inner and outer surfaces, wherein said first average thickness is greater than said second average thickness.

* * * * *